United States Patent Office 2,871,239
Patented Jan. 27, 1959

2,871,239

2-(2,6-DIMETHYL-4-MORPHOLINYLMERCAPTO)-BENZOTHIAZOLES

John J. D'Amico, Charleston, W. Va., assignor to Monsanto Chemical Company, St. Louis, Mo., a corporation of Delaware No Drawing. Application December 27, 1955
Serial No. 555,296

4 Claims. (Cl. 260—247.1)

The invention relates to new compounds and to methods for their preparation. More particularly, this invention relates to 2-(2,6-dimethyl-4-morpholinylmercapto)benzothiazole and to its preparation.

The new compound possesses a remarkable combination of desirable properties. It is a stable, light colored, relatively high melting crystalline solid which forms in substantially quantitative yield by oxidative condensation of mercaptobenzothiazole and 2,6-dimethyl morpholine. The technical product is essentially pure after filtering from the reaction medium, washing and drying and can be stored for an indefinite period without change. Halogen and alkyl substituted mercaptobenzothiazoles also condense with 2,6-dimethyl morpholine to yield stable, high melting solids. On the other hand, 3,5-dimethyl-4-morpholinyl mercaptobenzothiazole is resinous. The known 2-(4-morpholinyl mercapto)benzothiazole forms with difficulty, is always contaminated with 2,2'-dithiobis benzothiazole and steadily decomposes during storage. The preparation and properties of the new compound and typical examples of substituted derivatives thereof are described in further detail below.

EXAMPLE 1

A solution of the sodium salt of 2-mercaptobenzothiazole was prepared by mixing 43 grams (0.25 mole) of 97% 2-mercapto benzothiazole, 40 grams (0.25 mole) of 25% sodium hydroxide and 50 grams of water. After stirring for an hour, 115 grams (1.0 mole) of 2,6-dimethyl morpholine (U. S. Patent 1,859,527) was added in 15 minutes at 20–25° C. and the mixture stirred for another 5 minutes. There was then added 42 ml. (0.125 mole) of 25% sulfuric acid while maintaining the temperature at 20–25° C. After 5 minutes additional stirring and at 25–35° C. there was added over a period of 85 minutes 155 ml. (0.30 mole) of sodium hypochlorite solution containing 14.47 grams of sodium hypochlorite per 100 ml. The mixture was stirred at 34–35° C. for an hour longer and the excess hypochlorite then destroyed by the addition of 5 grams of sodium sulfite. The product was cooled to 25° C. by the addition of cold water, separated by filtration, washed neutral and dried for 12 hours in a 50° C. forced air oven. This procedure gave a quantitative yield of 2-(2,6-dimethyl-4-morpholinylmercapto)benzothiazole, M. P. 94–96° C. Analysis gave 22.90% sulfur as compared to 22.87% calculated for $C_{13}H_{16}N_2OS_2$.

EXAMPLE 2

To a stirred solution containing 45.3 grams (0.25 mole) of 4-methyl-2-mercaptobenzothiazole, 40 grams (0.25 mole) of 25% sodium hydroxide and 50 grams of water was added dropwise 115.2 grams (1.0 mole) of 2,6-dimethyl morpholine over a period of 15 minutes and stirring continued for another 15 minutes. Then 50 ml. (0.15 mole) of 25% sulfuric acid was added dropwise during another 15 minutes and stirring continued as before for an additional 15 minutes. Then 151 ml. (0.3 mole) of sodium hypochlorite solution containing 14.9 grams of sodium hypochlorite per 100 ml. was added dropwise at 25–33° C. over a 90 minute period, the reaction mixture stirred for a 90 minute period at 25–30°C. and 3 grams of sodium sulfite used to destroy the hypochlorite. The mixture was filtered and the separated solids washed with water until the washings were neutral to litmus and air-dried at room temperature. The 2-(2,6-dimethyl-4-morpholinylmercapto)-4-methyl benzothiazole so obtained was a tan solid which, after recrystallization from ethyl alcohol, melted at 87–88° C. Analysis gave 9.79% nitrogen and 22.11% sulfur as compared to 9.52% nitrogen and 21.78% sulfur calculated for $C_{14}H_{18}N_2OS_2$.

EXAMPLE 3

5-chloro-2-mercaptobenzothiazole was substituted for 2-mercaptobenzothiazole in the procedure of Example 2. In this example 230.4 grams (2.0 moles) of 2,6-dimethyl morpholine was used, 50 ml. of 25% sulfuric acid and 155 ml. (0.3 mole) of sodium hypochlorite solution containing 14.9 grams of sodium hypochlorite per 100 ml. The hypochlorite was added at 30–40° C. and stirred for an hour at this temperature. The 2-(2,6-dimethyl-4-morpholinylmercapto)-5-chlorobenzothiazole, M. P. 97–99° C., was obtained in 99% theory yield. Analysis gave 20.37% sulfur and 11.59% chlorine as compared to 20.37% sulfur and 11.26% chlorine calculated for $C_{13}H_{15}ClN_2OS_2$.

Stability was measured after shelf aging by analyzing for 2,2'-dithiobis benzothiazole. The latter is insoluble in ether whereas the desired products are readily soluble and it is therefore convenient to express the results as percent ether insoluble. An increase in percentage of ether insolubles indicates decomposition. The results are shown in Table I.

Table I

| | Percent Ether Insoluble After Storage at Room Temperature | | | |
|---|---|---|---|---|
| | 0 Days | 84 Days | 128 Days | 730 Days |
| 2-(4-Morpholinylmercapto)benzothiazole | 3.3 | 8.0 | | |
| 2-(2,6-Dimethyl-4-morpholinylmercapto)benzothiazole | 0.32 | | 0.16 | 0.16 |

The figures show no change in 2-(2,6-dimethyl-4-morpholinylmercapto)benzothiazole, all determinations being within experimental error.

The new compounds are intended primarily for use in rubber compositions for accelerating vulcanization but possess fungicidal activity and have other uses. 2-(2,6-dimethyl-4-morpholinylmercapto)benzothiazole provides exceptional processing safety and at curing temperature imparts excellent physical properties characterized by a flat curving curve. Vulcanizable compositions were compounded comprising

| Stock | A | B |
|---|---|---|
| | Parts by weight | Parts by weight |
| Smoked sheets rubber | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| N,N'-Dinitroso-N,N'-diphenyl-p-phenylenediamine | 1.5 | 1.5 |
| 2-(4-Morpholinylmercapto)benzothiazole | 0.5 | |
| 2-(2,6-Dimethyl-4-morpholinylmercapto)benzothiazole | | 0.5 |

The stocks so compounded were cured in the usual manner by heating in a press at 144° C. for different periods of time. The modulus and tensile properties of the resulting products are set forth below:

Table II

| Stock | Cure Time in Mins. | Modulus of Elasticity in lbs./in.² at Elongation of 300% | Tensile at Break in lbs./in.² |
|---|---|---|---|
| A | 30 | 2,160 | 3,946 |
| B | 30 | 2,053 | 3,817 |
| A | 45 | 2,330 | 3,686 |
| B | 45 | 2,340 | 3,803 |
| A | 60 | 2,116 | 3,640 |
| B | 60 | 2,340 | 3,763 |

The processing safety of the uncured compositions was evaluated by means of a Mooney plastometer. The time required for incipient vulcanization or scorch was taken at the point on the plasticity curve when the plasticity began to rise continuously.

Table III

Stock:           Mooney scorch in minutes at 135° C.

A ------------------------------------- 17.6
B ------------------------------------- 22.9

It is intended to cover all changes and modifications of the examples of the invention herein chosen for purposes of disclosure which do not constitute departures from the spirit and scope of the invention.

What is claimed is:

1. A 2 - (2,6-dimethyl-4-morpholinylmercapto)benzothiazole wherein the benzothiazole substituent is selected from the group consisting of unsubstituted benzothiazole, chloro substituted benzothiazole and lower alkyl substituted benzothiazole.

2. 2 - (2,6 - dimethyl-4-morpholinylmercapto)benzothiazole.

3. 2 - (2,6 - dimethyl - 4 - morpholinylmercapto) - 4 - methyl benzothiazole.

4. 2 - (2,6-dimethyl-4-morpholinylmercapto)-5-chlorobenzothiazole.

References Cited in the file of this patent

UNITED STATES PATENTS

| 2,271,834 | Carr | Feb. 3, 1942 |
| 2,730,526 | Kinstler | Jan. 10, 1956 |
| 2,730,527 | Kinstler | Jan. 10, 1956 |
| 2,758,995 | Sullivan | Aug. 14, 1956 |
| 2,766,237 | D'Amico | Oct. 9, 1956 |